R. C. HILLS.
PROCESS OF EXTRACTING ALKALIS FROM SILICATES.
APPLICATION FILED DEC. 5, 1918.
1,321,632.
Patented Nov. 11, 1919.
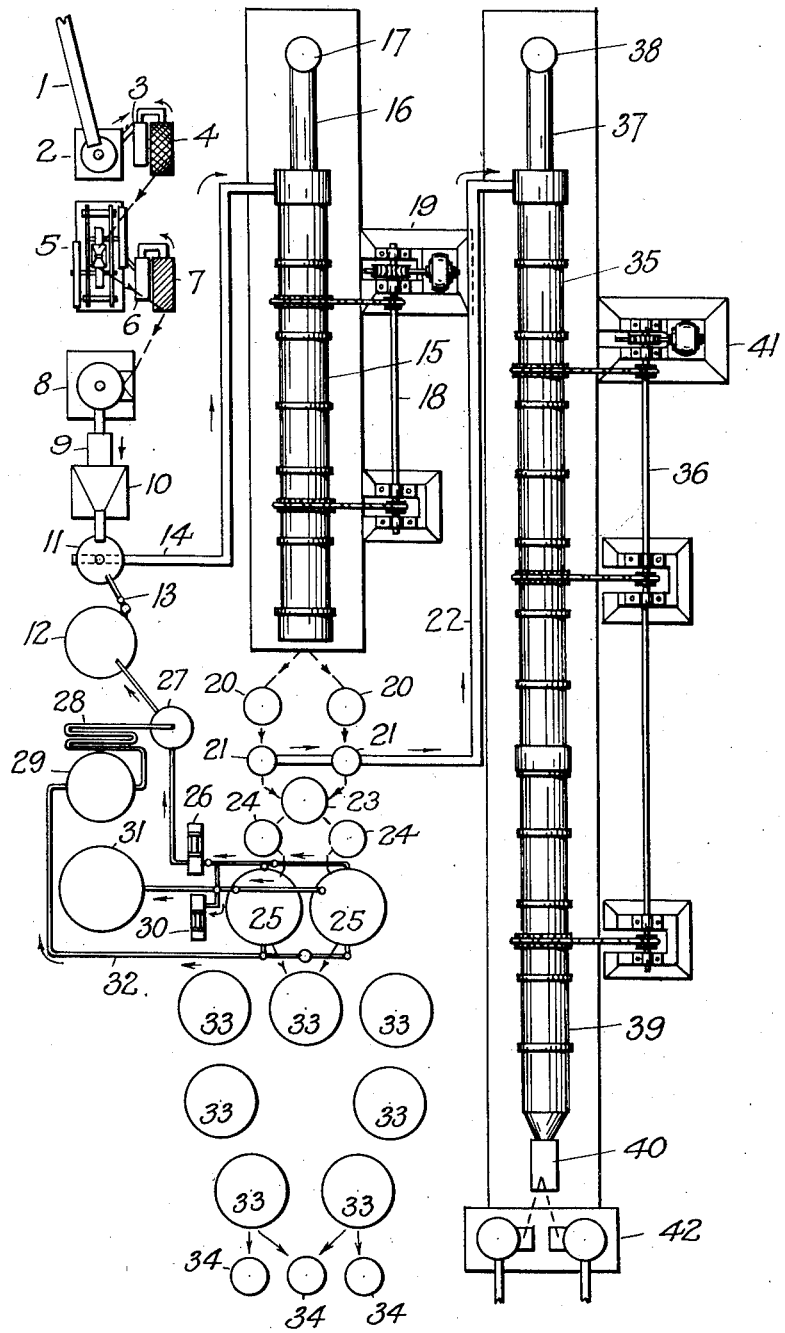
INVENTOR
RICHARD C. HILLS
BY
ATTORNEY

UNITED STATES PATENT OFFICE.

RICHARD C. HILLS, OF DENVER, COLORADO, ASSIGNOR OF ONE-HALF TO OLNEY NEWELL, OF DENVER, COLORADO.

PROCESS OF EXTRACTING ALKALIS FROM SILICATES.

1,321,632.    Specification of Letters Patent.    Patented Nov. 11, 1919.

Application filed December 5, 1918. Serial No. 265,393.

*To all whom it may concern:*

Be it known that I, RICHARD C. HILLS, a subject of George V, King of England, residing at Denver, in the county of Denver and State of Colorado, have invented certain new and useful Improvements in Processes of Extracting Alkalis from Silicates, of which the following is a specification.

This invention relates to a process for the extraction of alkalis from silicates, and its primary object is to provide a simple, economical and highly effective method of extracting from alkali-bearing silicate rocks, minerals, and mineral aggregates, such as pegmatite, wyomingite, feldspar and leucite, the alkalis in a condition for use in the various arts.

My process is particularly adapted for the production of potassium and sodium salts and it may be employed as a preliminary to a process of manufacturing Portland cement.

My process consists in first mixing the material under treatment in a finely divided state with calcium chlorid ($CaCl_2$) and calcium carbonate ($CaCO_3$) in suitable proportions, then roasting this mixture to decompose the silicates in the material and transform the alkalis into soluble chlorids, then leaching out the chlorids with water and removing the calcium hydrate to be subsequently precipitated from the filtrate, as insoluble calcium carbonate, then evaporating the solution to dryness and dissolving out the calcium chlorid with alcohol for its separation from the insoluble alkali metal chlorids, and finally separating the different alkali metal compounds such as potassium chlorid, sodium chlorid, etc., by crystallization in the usual way.

The residue of the leaching step of the process can be used in the manufacture of Portland cement by any known method, and after the calcium chlorid has been separated from the product of the roasting action, the alcohol and surplus calcium chlorid may be recovered by distillation for further use.

Describing the various steps of the process as outlined hereinabove, in detail, the silicate and the calcium carbonate (limestone) are both ground to a finely divided condition and then mixed with the calcium chlorid.

The proportions in which the three substances are intermixed vary in accordance with the character of the material under treatment and are not subject to any definite rule.

It may be given as an example that in the treatment of a potassium aluminum silicate, such as orthoclase ($KAlSi_3O_8$) a quantity of calcium carbonate three times the weight of the silicate, and a quantity of calcium chlorid one-half the weight of the silicate have been found to produce satisfactory results.

The quantity of calcium carbonate depends also upon the setting time of the cement to be manufactured from the residue of the leaching step of the process, and naturally varies in accordance with the percentages of silica and alumina contained in the feldspar.

The calcium chlorid is added to the finely pulverized silicate and calcium carbonate in solution of definite strength and a small quantity of water is added to the mixture which subsequently is thoroughly incorporated and kneaded into a thick paste.

The roasting step of the process is conducted in a suitable furnace during a period which varies according to circumstances. It is preferred to subject the material in the roasting furnace to heat of gradually increasing temperature which at the expiration of a definite period of continuous treatment (usually two hours) ends in a full red heat.

The calcium carbonate in the material is during the roasting action reduced to the caustic condition, decomposing the silicates and liberating the alkalis which react with the calcium chlorid to produce soluble alkali metal chlorids according to the following equation: $CaCl_2 + K_2O = CaO + 2KCl$.

On completion of the roast the soluble alkali metal chlorids together with the excess of calcium chlorid are leached out with water, and the leach or filtrate is transferred to a vat where the calcium hydrate in solution is precipitated as calcium carbonate which is separated from the solution by filtration. The carbon dioxid necessary for this action is preferably obtained from the spent flue gases of the furnace in which the material is roasted.

The solution containing the alkali metal chlorids is evaporated to dryness in the usual manner and the dry residue is digested with strong alcohol whereby the calcium chlorid is dissolved to be subsequently separated from the insoluble alkali metal chlorids by filtration.

Although any commercial alcohol may be employed to dissolve the calcium chlorid contained in the product of the roasting step of my process, I prefer to use ethyl alcohol ($C_2H_5HO$) as being best adapted for the purpose.

The alkali metal chlorids thus extracted from the material under treatment are dissolved in water and the salts separated from one another by crystallization in the usual manner.

The slurry, residuent of the leaching step of the process, is conveyed to a clinkering furnace for the manufacture of Portland cement, and the alcohol and surplus calcium chlorid are recovered by distillation.

When the chlorids are repeatedly subjected to the dissolving action of the alcohol, it is preferred to recover the alcohol from the first digestion, which is saturated with calcium chlorid, by steam distillation and to reserve the alcohol from subsequent digestions and washings for further use as a solvent until saturated with calcium chlorid when that portion will also be recovered by distillation.

The dry calcium chlorid recovered by the distillation of the alcohol can be used as before in the first step of the process, for the treatment of fresh material.

While any apparatus suitable to effect the sequence of actions herein described, may be employed to carry the process into effect, a system of devices constructed and coöperatively arranged in the best manner at present known to me, has been shown in outline in the accompanying drawing which represents a plan view of the same.

Referring to the drawing by numerical reference characters, the numeral 2 designates a crusher into which the alkali-bearing material under treatment together with a certain proportion of calcium carbonate, is fed by the use of a chute 1.

The product of the crusher is by means of an elevator 3 conveyed to an overhead revolving screen 4 which divides the crushed material into two sizes.

The fine material discharged through the screen is conveyed to crushing rolls 5 and the oversize is returned to the crusher for further initial comminution.

The product delivered by the rolls is again screened in an overhead revolving screen 7 to which it is conducted by means of an elevator 6, the screenings being conveyed to a Griffin mill 8 for further trituration, and the oversize being returned to the rolls.

The fine product of the mill is discharged onto an elevator 9 which carries it to a storage bin 10.

Definite quantities of the pulverized material are removed from the storage bin and fed into a mixer 11 together with the proportionate quantity of calcium chlorid which is drawn from a storage tank 12 and accurately proportioned by the use of a measuring device 13.

The material under treatment, the calcium carbonate and the calcium chlorid are in a thoroughly intermixed condition discharged from the mixer 11 onto a conveyer 14 by which it is carried to the upper or feed end of the inclined rotary drum of a roasting furnace 15 which receives its rotary movement from a conveniently located motor 19 through the intermediary of a shaft 18 and the usual sprocket wheels and chains.

A spraying device is disposed in a flue 16 between the furnace and its stack 17, for the purpose of intercepting and retaining any vaporized alkali metal chlorids that may pass over during the roasting process.

The material fed into the revolving drum of the furnace by the conveyer 14, is roasted during the determinate period hereinbefore referred to, after which it is transferred to grinding pans 20 in which it is broken up and ground in water heated by steam, by the action of revolving iron mullers.

When sufficiently ground, the emulsion produced in the pans 20 is discharged into revolving filtering vessels 21 in which the soluble chlorids including the excess of calcium chlorid, are leached out by filtering and washing with water, the filtrate flowing into a tank 23 and the residuent slurry being discharged into a steam-jacketed conveyer 22.

The solution containing the soluble chlorids is transferred from the tank 23 to precipitation vats 24 preferably through the medium of steam injectors. In these vats, which are provided with filter bottoms, the calcium hydrate in the solution is precipitated as calcium carbonate by carbon dioxid preferably derived from the spent flue gases of the furnace, the precipitate is filtered off and the filtrate containing the alkali metal chlorids and calcium chlorids is charged into covered digesting vats 25 where the solution is evaporated to dryness by means of steam chambers preferably located beneath their bottom surfaces.

During the evaporative action the material is constantly agitated by suitable stirring devices to insure a granulated residue which is subsequently digested with strong alcohol to dissolve the calcium chlorid which is drawn off by means of a pump 26.

The residue of insoluble alkali metal chlorids remaining in the vats 25 is washed off with fresh alcohol which until saturated, is drawn off by a pump 30, and any alcohol retained by the granulated chlorids is recovered by steam heat through a pipe 32.

The residue of alkali metal chlorids in the vats 25 is finally dissolved in water and transferred to crystallizing vats 33 where by fractional crystallization the different chlorids are separated from each other and passed through centrifugal drainers 34 from which they are removed as commercial products.

In order to prevent the waste of alcohol used in the process and recover it for use in the subsequent treatment of fresh material, the saturated alcohol solution drawn off the residue in the digesting vats 25 by means of the pump 26, is passed through a steam still 27, the alcohol vapors being condensed by a water-cooled coil 28 and separated from the calcium chlorid which in a hot fluid condition passes to the storage tank 12.

The condensed alcohol passes to a storage tank 29 which also receives the remaining alcohol which was recovered by steam heat from the granulated chlorids in the vats 25 and discharged through the before mentioned pipe 32 which is water-cooled for the purpose of condensation.

The alcohol used in washing the alkali metal chlorids after the first digestion, which is drawn off by the pump 30 is conveyed to a storage tank 31.

In the process of manufacturing Portland cement which is subsequent to the leaching step of the above-described process for the extraction of alkalis, the slurry discharged from the filters 21 is by means of a steam-jacketed conveyer 22 carried to the feed-end of the inclined rotary drum of a clinkering furnace 35, which is driven from a suitably located motor 41 through the medium of a shaft 36 and the usual sprocket wheels and chains.

A spraying device in a flue 37 between the furnace and its stack 38 intercepts and retains the vaporized alkali metal chlorids that may pass over during the clinkering stage.

The material fed into the revolving drum from the conveyer 22 is subjected to the conditions of time and temperature necessary to transform the slurry into normal cement clinker which is discharged into a rotary cooler 39 and conveyed by means of an elevator 40 to Griffin mills 42 by which it is ground into commercial cement.

Having thus described my invention what I claim and desire to protect by Letters-Patent is:

1. In a process of extracting alkalis from silicates, the step of dissolving calcium chlorid out of a product containing calcium chlorid and alkali metal chlorids, with alcohol.

2. A process of extracting alkalis from silicates consisting in roasting a mixture of silicates, calcium carbonate and calcium chlorid, leaching out the chlorids from the roasted product, removing calcium hydrate from the filtrate, evaporating the solution to dryness, and dissolving the calcium chlorid out of the residue, by the use of alcohol.

3. In a process of extracting alkalis from silicates, the steps of leaching out chlorids in water from a mixture of decomposed silicates and soluble chlorids, separating the chlorids including calcium chlorids and alkali metal chlorids out of the solution, separating the calcium chlorid from the alkali metal chlorids by dissolution with alcohol and filtration, and separating the calcium chlorid and the solvent in the filtrate.

4. In a process of extracting alkalis from silicates, the steps of decomposing silicates and transforming alkalis into soluble chlorids by the use of calcium chlorid as a chemical reagent, leaching out the chlorids, roasting the residue, and recovering the surplus calcium chlorid by the use of alcohol.

In testimony whereof I have affixed my signature.

RICHARD C. HILLS.